United States Patent
Lee et al.

(10) Patent No.: US 9,389,693 B2
(45) Date of Patent: Jul. 12, 2016

(54) APPARATUS AND METHOD FOR RECOGNIZING MOTION BY USING AN EVENT-BASED VISION SENSOR

(71) Applicant: SAMSUNG ELECTRONICS CO., LTD., Suwon-si (KR)

(72) Inventors: Jun-Haeng Lee, Yongin-si (KR); Hyun-Surk Ryu, Yongin-si (KR); Keun-Joo Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 95 days.

(21) Appl. No.: 14/351,806

(22) PCT Filed: Oct. 12, 2012

(86) PCT No.: PCT/KR2012/008287
§ 371 (c)(1),
(2) Date: Apr. 14, 2014

(87) PCT Pub. No.: WO2013/055137
PCT Pub. Date: Apr. 18, 2013

(65) Prior Publication Data
US 2014/0320403 A1     Oct. 30, 2014

(30) Foreign Application Priority Data
Oct. 14, 2011   (KR) .................. 10-2011-0105341

(51) Int. Cl.
*G06F 3/01*     (2006.01)
*G06F 3/042*    (2006.01)
(Continued)

(52) U.S. Cl.
CPC .............. *G06F 3/017* (2013.01); *G06F 3/0304* (2013.01); *G06K 9/00355* (2013.01); *G06K 9/4628* (2013.01); *G06T 7/20* (2013.01)

(58) Field of Classification Search
CPC ..... G06F 3/017; G06F 3/0325; G06F 3/0304; G06F 17/30811; G06F 17/3079; G06F 3/005; G06F 3/0412; G06F 2203/04109; G06F 3/042; G06F 3/0421; G06F 3/0423; G06F 3/0425; G06F 3/0426; G06T 2207/10016; G06T 7/20; G06T 7/2006; G06T 2207/30241; G06T 7/2086; G06T 2200/28; G06T 2207/20021; G06K 9/00355; G06K 9/4628; G06K 2009/3225
USPC .......................... 345/104, 156–176; 382/103
See application file for complete search history.

(56) References Cited

U.S. PATENT DOCUMENTS 5,454,043 A * 9/1995 Freeman ....................... 382/168
6,191,773 B1 * 2/2001 Maruno et al. ................ 345/158
(Continued)

FOREIGN PATENT DOCUMENTS

JP     4-260979 A    9/1992
JP    10-177449 A    6/1998
(Continued)

OTHER PUBLICATIONS

Search Report dated Jan. 31, 2013, issued by the International Searching Authority in counterpart International Application No. PCT/KR2012/008287.
(Continued)

*Primary Examiner* — Hong Zhou
(74) *Attorney, Agent, or Firm* — Sughrue Mion, PLLC

(57) ABSTRACT

An apparatus and method for recognizing motion by using an event-based vision sensor is provided. An apparatus for recognizing motion using an event-based vision sensor includes: a vision sensor to sense a movement-occurring part and output events; a movement type determiner configured to determine a type of movement using a frequency of occurrence of the events outputted through the vision sensor; a first motion determiner configured to track a movement trajectory of the movement-occurring part and determine a motion pattern based on the movement trajectory in response to a result of the movement type determination unit indicating a small movement; a second motion determiner configured to determine a direction of movement direction in which an object moves based on the events in response to a result of the movement type determination indicating a large movement; and a motion controller configured to output a control instruction to control a device.

23 Claims, 19 Drawing Sheets

(51) Int. Cl.
  *G06T 7/20* (2006.01)
  *G06K 9/00* (2006.01)
  *G06K 9/46* (2006.01)
  *G06F 3/03* (2006.01)

(56) References Cited

U.S. PATENT DOCUMENTS

| | | | |
|---|---|---|---|
| 7,728,269 B2 | 6/2010 | Lichtsteiner et al. | |
| 2004/0041794 A1* | 3/2004 | Kidode et al. | 345/173 |
| 2007/0126699 A1* | 6/2007 | Kwak et al. | 345/157 |
| 2007/0132725 A1* | 6/2007 | Kitaura | 345/156 |
| 2008/0033649 A1* | 2/2008 | Hasegawa et al. | 701/301 |
| 2008/0062125 A1* | 3/2008 | Kitaura | 345/157 |
| 2011/0223995 A1* | 9/2011 | Geisner et al. | 463/36 |
| 2011/0254765 A1* | 10/2011 | Brand | 345/158 |
| 2011/0291926 A1* | 12/2011 | Gokturk et al. | 345/158 |
| 2012/0061568 A1* | 3/2012 | Lee et al. | 250/338.1 |
| 2012/0257789 A1* | 10/2012 | Lee et al. | 382/103 |

FOREIGN PATENT DOCUMENTS

| | | |
|---|---|---|
| JP | 2000-196914 A | 7/2000 |
| JP | 2001-216069 A | 8/2001 |
| JP | 2002-366958 A | 12/2002 |
| JP | 2008-65663 A | 3/2008 |
| JP | 2009-64199 A | 3/2009 |
| JP | 2010-191826 A | 9/2010 |
| JP | 2011-513847 A | 4/2011 |
| JP | 2011-170747 A | 9/2011 |
| KR | 10-2003-0030232 A | 4/2003 |
| KR | 10-2011-0022057 A | 3/2011 |
| KR | 10-2011-0040165 A | 4/2011 |
| WO | 2010/008835 A1 | 1/2010 |

OTHER PUBLICATIONS

Communication dated Mar. 8, 2016, from the Japanese Patent Office in counterpart application No. 2014-535648.

* cited by examiner

110

FIG. 5
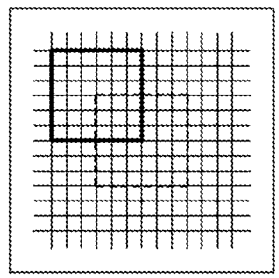
RECEPTIVE FIELD
OF C(i-1, j+1)
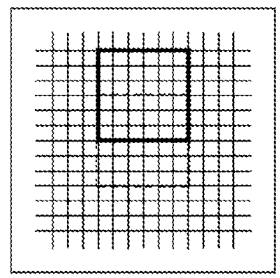
RECEPTIVE FIELD
OF C(i, j+1)
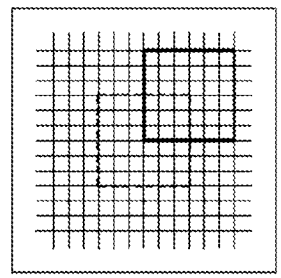
RECEPTIVE FIELD
OF C(i+1, j+1)
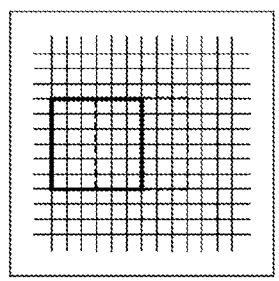
RECEPTIVE FIELD
OF C(i-1, j)
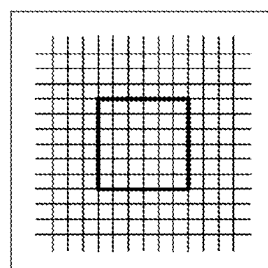
RECEPTIVE FIELD
OF C(i, j)
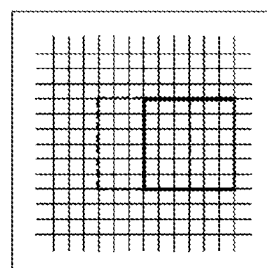
RECEPTIVE FIELD
OF C(i+1, j)
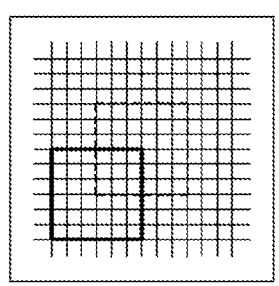
RECEPTIVE FIELD
OF C(i-1, j-1)
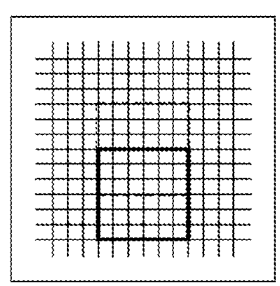
RECEPTIVE FIELD
OF C(i, j-1)
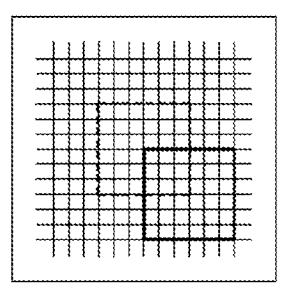
RECEPTIVE FIELD
OF C(i+1, j-1)

FIG. 9
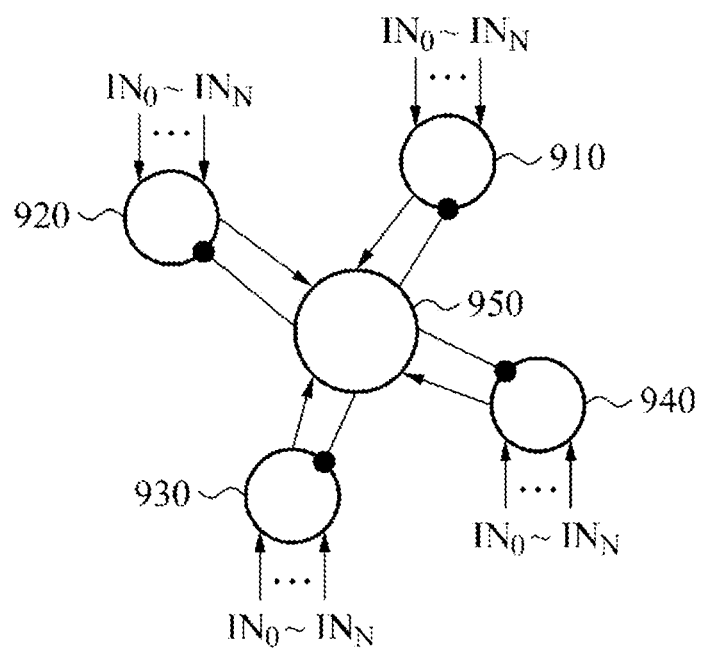

APPARATUS AND METHOD FOR RECOGNIZING MOTION BY USING AN EVENT-BASED VISION SENSOR

CROSS-REFERENCE TO RELATED APPLICATIONS

This application claims priority from Korean Patent Application No. 10-2011-0105341, filed on Oct. 14, 2011 in the Korean Intellectual Property Office and is a National Stage Application of PCT/KR2012/008287 filed Oct. 12, 2012, the disclosure of which are incorporated herein by reference, in their entireties.

BACKGROUND

1. Technical Field

Methods and apparatuses according to the exemplary embodiments relate to an apparatus and method for recognizing motion that tracks a movement trajectory of a finger or a movement direction of a hand using a vision sensor for sensing a movement-occurring part, and controls motion of a device.

2. Related Art

A user interface (UI) for interaction between humans and electronic devices may include, for example, a keyboard, a mouse and a touch panel. For example, based on touch technology used in the touch panel, a user may adjust a UI through direct contact with a screen. As a number of touch instances increases, damage may occur on the screen of the panel, and the user may experience an unhygienic effect due to repeated direct contact. Accordingly, there is a need for providing an intuitive interfacing technology which reinforces a natural sense of interaction between humans and electronic devices.

SUMMARY

According to an aspect of the exemplary embodiments, there is provided an apparatus for recognizing motion using an event-based vision sensor, the apparatus including a vision sensor configured to sense a movement-occurring part and output events, a movement type determination unit configured to determine a type of movement using an occurrence frequency of the events outputted through the vision sensor, a first motion determination unit configured to track a movement trajectory of the movement-occurring part and determine a motion pattern based on the movement trajectory in response to a result of the movement type determination unit indicating a small movement, a second motion determination unit configured to determine a movement direction in which an object moves based on the events in response to a result of the movement type determination indicating a large movement, and a motion control unit configured to output a control instruction to control a device based on the motion pattern determined by the first motion determination unit or the direction of movement determined by the second motion determination unit.

The movement type determination unit may be configured to calculate an occurrence frequency of the events outputted through the vision sensor and compare the occurrence frequency to a predetermined threshold value in order to determine the occurrence frequency to be a small movement in which a portion of an object moves in response to the occurrence frequency being less than the threshold value, and determine the occurrence frequency to be a large movement in which a whole of the object moves in response to the occurrence frequency being greater than or equal to the threshold value.

The first motion determination unit may include spatiotemporal correlators which correspond to a plurality of predetermined receptive fields of the vision sensor that receive inputs of events outputted from the predetermined receptive fields and is configured to calculate a spatiotemporal correlation for each of the predetermined receptive fields, a movement trajectory tracking unit configured to track a movement trajectory of the movement-occurring part based on a fluctuation in a spatiotemporal correlation of the predetermined receptive fields, and a motion pattern determination unit configured to determine a motion pattern of the movement-occurring part, from the tracked movement trajectory.

The receptive fields may be configured to correspond to divided areas of the vision sensor and overlap an area of another neighboring receptive field.

The movement trajectory tracking unit may be configured to generate a cluster by grouping spatiotemporal correlators having a high spatiotemporal correlation from among the spatiotemporal correlators, set a predetermined area including the cluster to be a clustering area, calculate a center of the clustering area to be a location of a moving object, and track a movement trajectory in conjunction with the calculated location of the moving object.

The movement trajectory tracking unit may be configured to re-calculate a center of a previous clustering area based on an internal state value of spatiotemporal correlators in the previous clustering area, calculate the re-calculated center of the previous clustering area to be a location of the moving object, and track a movement trajectory in conjunction with the calculated location of the moving object in response to spatiotemporal correlators having a high spatiotemporal correlation being absent among the spatiotemporal correlators.

The second motion determination unit may include a first direction detection filter configured to receive an input of events outputted from a plurality of predetermined receptive fields of the vision sensor and detect a movement direction in which the object moves for the plurality of predetermined receptive fields, and a second direction detection filter configured to determine a final movement direction of the object based on the movement direction detected for the plurality of receptive fields.

The predetermined receptive fields may be configured to correspond to divided areas of the vision sensor, overlap an area of another neighboring receptive field, and be provided in the form of a circle.

The first direction detection filter may be configured to include at least one winner takes all circuit which corresponds to each of the predetermined receptive filters, and the winner takes all circuit may output the direction of movement of the object from a corresponding receptive filter, using a number of neurons which correspond to a number of directions determined by the second motion determination unit.

The second direction detection filter may be configured to include a winner takes all circuit to determine the final direction of movement direction of the object based on the movement direction detected for the plurality of receptive fields, and the winner takes all circuit may output the final movement direction of the object based on the movement direction detected for the plurality of predetermined receptive fields using a number of neurons corresponding to the number of directions determined by the second motion determination unit.

The second direction detection filter may be configured to determine the final movement direction of the object by calculating a vector sum of the movement direction detected for the plurality of predetermined receptive fields.

The apparatus for recognizing the motion using the event-based vision sensor may further include a third motion determination unit configured to classify the events outputted through the vision sensor into an ON event and an OFF event, calculate a rate of the OFF event, and determine progression or regression of an object by comparing the rate to at least one predetermined reference value in response to a result of the movement type determination unit indicating a small movement.

According to another aspect of the exemplary embodiments, there is provided an apparatus for recognizing motion using an event-based vision sensor, the apparatus including a vision sensor configured to sense a movement-occurring part and output events, a first direction detection filter configured to receive an input of events outputted from a plurality of predetermined receptive fields of the vision sensor, and detect a movement direction in which an object moves for the plurality of predetermined receptive fields, a second direction detection filter configured to determine a final direction of movement of the object based on the movement direction detected for the plurality of predetermined receptive fields, and a motion control unit configured to output a control instruction to control a device based on the determined movement direction.

The first direction detection filter may include at least one winner takes all circuit which corresponds to each of the predetermined receptive fields, and the winner takes all circuit may be configured to output the movement direction of the object from a corresponding receptive filter, using a number of neurons which correspond to a number of directions determined by the second motion determination unit.

The second direction detection filter may include a winner takes all circuit configured to determine the final movement direction of the object based on the movement direction detected for the plurality of predetermined receptive fields, and the winner takes all circuit may be configured to output the final movement direction of the object based on the movement direction detected for the plurality of predetermined receptive fields using a number of neurons which correspond to the number of directions determined by the second motion determination unit.

According to an aspect of the exemplary embodiments, there is provided a method of recognizing motion, the method including receiving an input of an event corresponding to a movement-occurring part from a vision sensor, determining a type of movement based on an event occurrence frequency, tracking a movement trajectory of the movement-occurring part and determining a motion pattern based on the movement trajectory in response a result of the determining the type of movement indicates a small movement, determining a movement direction in which an object moves based on the events when a result of the determining the type of movement indicates a large movement, and controlling a device based on the determined motion pattern or the determined movement direction.

According to an aspect of the exemplary embodiments, there is provided a method of recognizing motion, the method including receiving an input of events outputted from a plurality of predetermined receptive fields of a vision sensor, detecting a movement direction in which an object moves for the plurality of predetermined receptive fields, determining a final movement direction of the object based on the movement direction detected for the plurality of predetermined receptive fields, and controlling a device based on the determined movement direction.

According to an aspect of the exemplary embodiments, there is provided an apparatus for recognizing motion using an event-based vision sensor, the apparatus including a vision sensor configured to sense a movement-occurring part and output events, and a plurality of direction detection filters provided in a hierarchical structure that receives an input of events outputted from predetermined receptive fields of the vision sensor and recognizes a direction of movement.

An aspect of an exemplary embodiment may provide an apparatus for recognizing motion using an event-based vision sensor, the apparatus including: a vision sensor configured to sense a movement-occurring part and output events; a movement type determiner configured to determine a type of movement using a frequency of occurrence of the events outputted through the vision sensor; a motion determiner configured to track a movement trajectory of the movement-occurring part and determine a motion pattern based on the tracked movement trajectory in response to a result of the movement type determiner indicating a small movement; the motion determiner being further configured to determine a direction of movement in which an object moves based on the events in response to a result of the movement type determination indicating a large movement; and a motion controller configured to output a control instruction to control a device based on the motion pattern or the movement direction.

The movement type determiner may be configured to calculate an occurrence frequency of the events outputted through the vision sensor and compare the occurrence frequency to a predetermined threshold value in order to determine the occurrence frequency to be a small movement in which a portion of an object moves in response to the occurrence frequency being less than the threshold value, and determine the occurrence frequency to be a large movement in which a whole of the object moves in response to the occurrence frequency being greater than or equal to the predetermined threshold value.

According to exemplary embodiments, there is provided an apparatus and method for recognizing motion using a vision sensor that receives an input of events corresponding to a movement-occurring part from a vision sensor and determines a type of movement based on a frequency of occurrence of events, determines a motion pattern based on a movement trajectory in response to a result of the movement type determination indicating a small movement, determines a movement direction in which an object moves in response to a result of the movement type determination indicating a large movement, and controls a device based on the determined motion pattern or the determined movement direction, thereby relatively rapidly recognizing a movement of an object at a speed of 1 millisecond (ms), has a low power consumption, and is insusceptible to the brightness of an environment.

BRIEF DESCRIPTION OF THE DRAWINGS

FIG. 5 is a diagram which illustrates a spatial correlation amongst a first to n-th spatiotemporal correlators according to an exemplary embodiment.

FIG. 9 is a diagram which illustrates an example of a winner takes all circuit according to an exemplary embodiment.

DETAILED DESCRIPTION OF THE EXEMPLARY EMBODIMENTS

Figure 1:
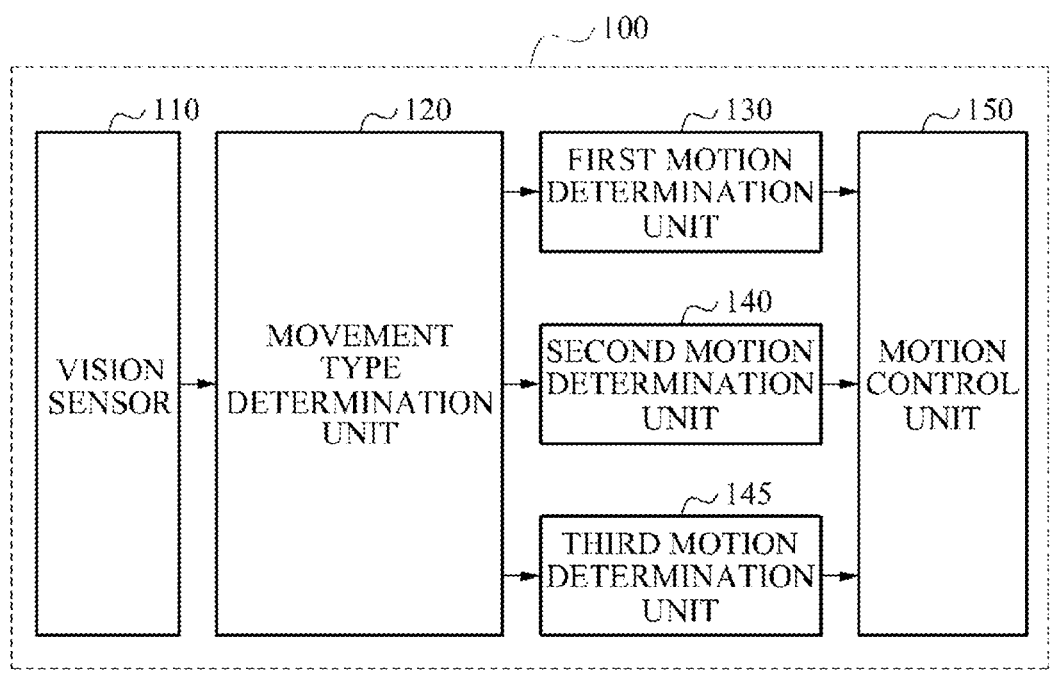
FIG. 1 is a diagram which illustrates an example of a configuration of an apparatus for recognizing motion according to an exemplary embodiment.

Reference will now be made in detail to the exemplary embodiments, examples of which are illustrated in the accompanying drawings, wherein like reference numerals refer to the like elements throughout. Exemplary embodiments are described below in order to explain the exemplary embodiments by referring to the figures.

FIG. 1 is a diagram which illustrates an example of a configuration of an apparatus 100 for recognizing motion according to an exemplary embodiment.

Referring to FIG. 1, the apparatus 100 for recognizing the motion that recognizes a motion pattern based on a small movement such as a finger, or recognizes a movement direction of a large movement such as a palm of a hand includes a vision sensor 110, a movement type determination unit 120, e.g., a motion type determiner, a first motion determination unit 130, e.g. a first motion determiner 130 a second motion determination unit 140, e.g., a second motion determiner 140, a third motion determination unit 145, e.g., a third motion determiner 145, and a motion control unit 150, e.g., a motion controller.

Figure 4:
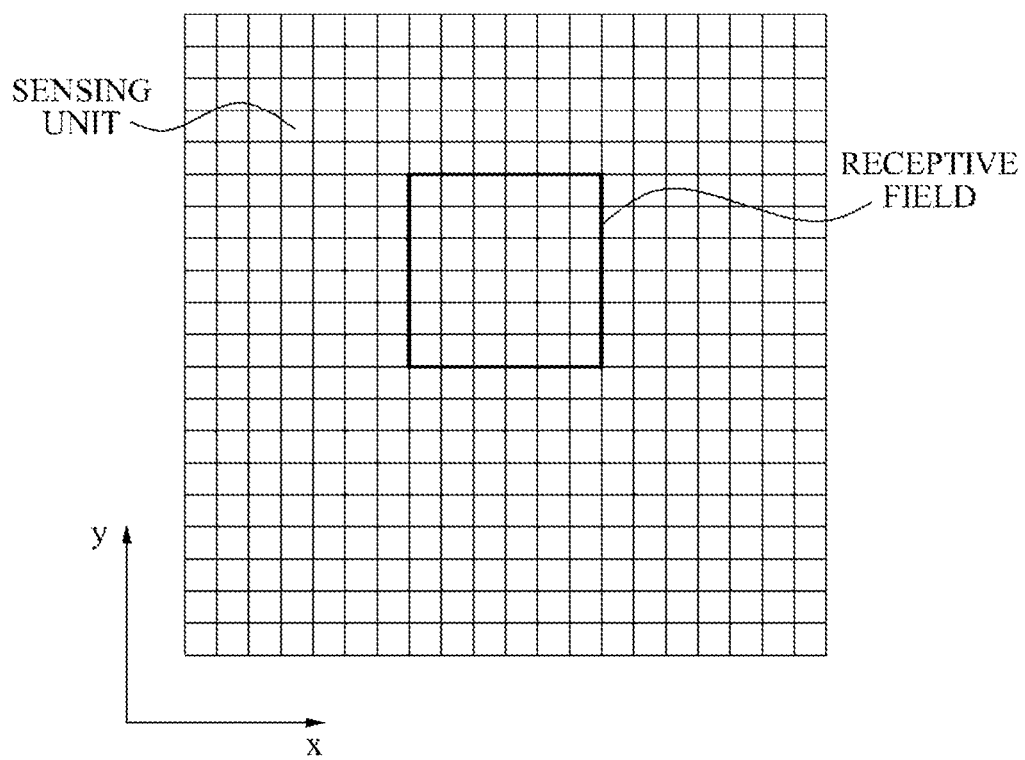
FIG. 4 is a diagram which illustrates an example of an array of sensing units configuring a vision sensor and receptive fields according to an exemplary embodiment.

The vision sensor 110 may sense a movement-occurring part within an object and output sensed events. The vision sensor 110 includes an array of a plurality of sensing units, e.g. sensors, as illustrated in FIG. 4. The sensing units may be provided in a pixel unit of an image. For example, in response to a touch screen for an interface outputting an image of 60×60, sensing units may be provided in a form of 60×60.

The sensing units may refer to light receiving elements. In response to an object or a portion of the object moving, the intensity of light sensed by sensing units of a first image sensor 111 may vary. In an instance of the first image sensor 111, target sensing units, e.g. target sensors, from which a change in light intensity is sensed from among the sensing units may output events. Target sensing units which correspond to a movement-occurring part from among the sensing units may output events. The target sensing units may refer to sensing units that output events.

An event may include information, for example, an event-occurring time, a location of a sensing unit outputting an event, and a polarity. The polarity may be "ON" in response to an event caused by an increase of intensity of light received from a sensing unit occurring, and may be "OFF" when an event caused by a decrease of intensity of light received occurs. The sensing unit may output an event in response to a level of change in light intensity being greater than or equal to a predetermined reference value.

The movement type determination unit 120 may determine a type of movement using an occurrence frequency, e.g., a frequency of occurrence of events outputted through the vision sensor 110. The type of movement may include a small movement and a large movement. As an example, the small movement may be a forward/backward movement of an object, for example, a hand, or a movement of a finger, and the large movement may be a movement of an entire hand, for example, a palm of a hand.

The movement type determination unit 120 may detect one of the forward/backward movement of the hand and the movement of the finger, or distinguish between the forward/backward movement of the hand and the movement of the finger based on more detailed criteria, in response to a request of a predetermined user when a small movement is detected.

In various examples described herein, the small movement is referred to as a finger movement, and the large movement is referred to as a hand movement, for conciseness and ease of description.

Figure 2:
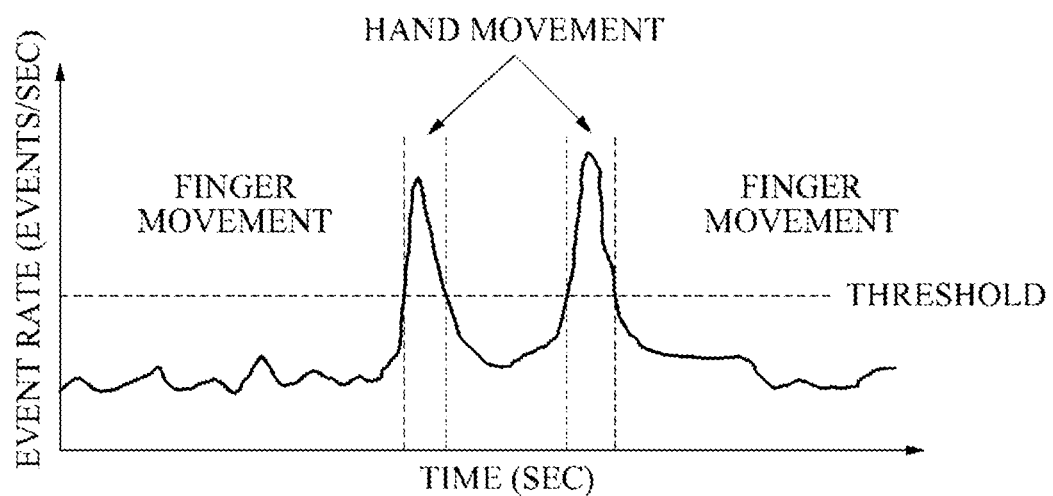
FIG. 2 is a graph which illustrates a method of determining a type of movement using an occurrence frequency of events according to an exemplary embodiment.

The movement type determination unit 120 may determine the type of movement, as shown in an example of FIG. 2.

FIG. 2 is a graph which illustrates a method of determining a type of movement using an occurrence frequency of events according to an exemplary embodiment.

Referring to FIG. 2, an occurrence frequency of events of the vision sensor 110 is low when a finger moves, and an occurrence frequency of events of the vision sensor 110 is high when a hand moves. Accordingly, the movement type determination unit 120 may determine whether a finger moves or an entire hand moves, based on a predetermined threshold value.

The first motion determination unit 130 may track a movement trajectory of a movement-occurring part, and determine a motion pattern based on a movement trajectory based on a spatiotemporal correlation of events outputted from the vision sensor 110.

Figure 3:
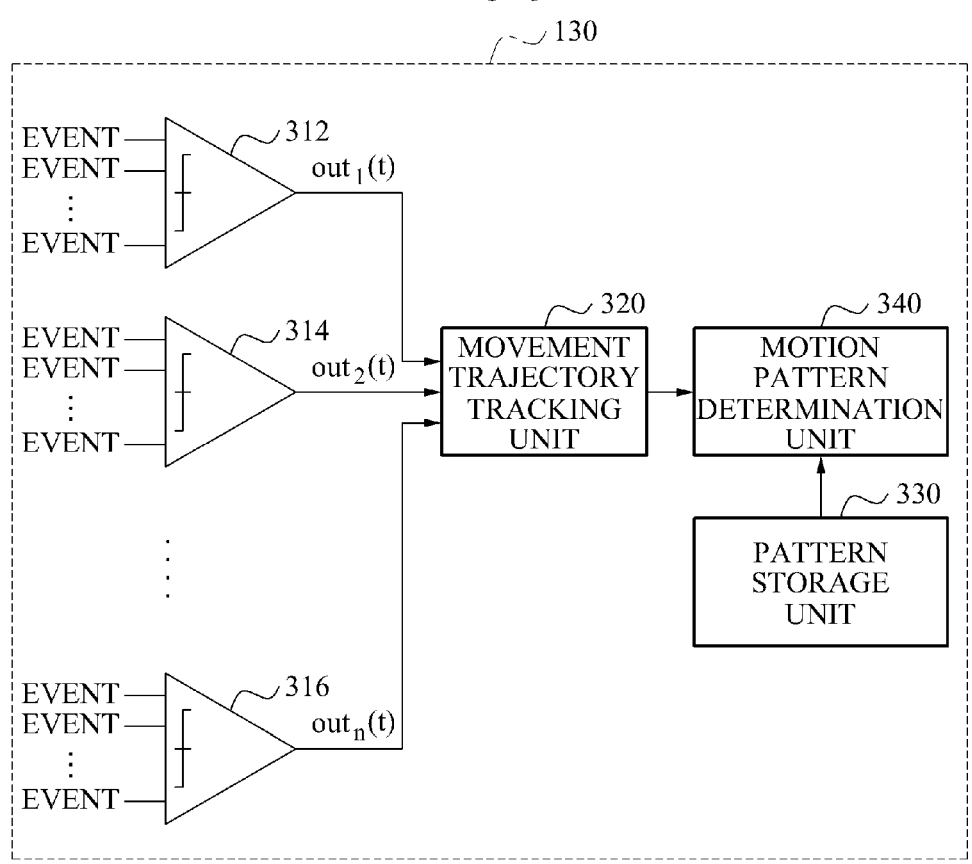
FIG. 3 is a diagram which illustrates an example of a configuration of a first motion determination unit according to an exemplary embodiment.

FIG. 3 is a diagram which illustrates an example of a configuration of a first motion determination unit 130 according to an exemplary embodiment.

Referring to FIG. 3, the first motion determination unit 130 includes first to n-th spatiotemporal correlators 312, 314, and 316, a movement trajectory tracking unit 320, e.g., a movement trajectory tracker 320, a pattern storage unit 330, e.g., a pattern storage, and a motion pattern determination unit 340, e.g. a motion pattern determiner 330.

The spatiotemporal correlators 312, 314, and 316 may calculate a plurality of spatiotemporal correlations amongst target sensing units based on events inputted from the target sensing units. The spatiotemporal correlators 312, 314, and 316 may be implemented by spiking neurons.

Hereinafter, for descriptions of a spatiotemporal correlation, a receptive field will be discussed with reference to FIG. 4, and an example of a first spatiotemporal correlator 121-1 will be used.

FIG. 4 is a diagram which illustrates an example of an array of sensing units configuring a vision sensor and receptive fields according to an exemplary embodiment.

Referring to FIG. 4, the first spatiotemporal correlator 312 may receive an input of an event outputted from sensing units forming a predetermined area of the vision sensor 110. The predetermined area may refer to a receptive field. An area electrically connected with the first spatiotemporal correlator 312 and occupied by sensing units that output events to the first spatiotemporal correlator 312 may refer to a receptive field. The receptive field may have a size of m×m, "m" being a positive number. Accordingly, the first spatiotemporal correlator 312 may receive an input of events from at least one of the sensing units of the receptive fields. The second to n-th spatiotemporal correlators 314 through 316 may also receive an input of events by being connected to sensing units of a corresponding receptive field.

Referring to FIG. 3, the first to n-th spatiotemporal correlators 312, 314, and 316 may have a plurality of internal state values which respectively indicate current spatiotemporal correlations. The plurality of internal state values may be identical to or differ from one another, and an example may include a voltage value. The internal state value may be determined by a current internal state value and a new input of an event. In response to an event being input, an internal state value may increase, and in an absence of an event, an internal state value may decrease based on a predetermined period of elapsed time. The decrease in the internal state value may minimize a bandwidth load of a memory storing the internal state value.

The first to n-th spatiotemporal correlators 312, 314, and 316 may increase the internal state value in response to events being input from the corresponding vision sensor 110 to compare the increased internal state value to a predetermined threshold value, in order to determine a fluctuation of a spatiotemporal correlation. The spatiotemporal correlation may indicate a temporal correlation and a spatial correlation of events respectively inputted to the first to n-th spatiotemporal correlators 312, 314, and 316.

Equation 1 is an equation for calculating an output value outputted from a spatiotemporal correlator in response to an input of an event.

$$Q_n(t) = f(Q_n(t_{prev}), e(t))$$

$$out_n(t) = \phi Q_n(t)$$ [Equation 1]

In Equation 1, $Q_n(t)$ denotes an internal state value of an n-th spatiotemporal correlator at a point of time "t", $Q_n(t_{prev})$ denotes an internal state value of an n-th spatiotemporal correlator at a previous point of time for example, a current internal state value, and "$t_{prev}$" denotes a point of time at which a most recent event set occurs from among previously inputted event sets. e(t) denotes an event set inputted at a point of time "t", $out_n(t)$ denotes an output value of an n-th spatiotemporal correlator, and $\phi$ denotes a threshold value. An event set may refer to basic information related to events occurring at a point of time "t". For example, in response to three events occurring at a point of time "t=0", e(0)={e_1, e_2, e_3}. "e_n", where "n"=1, 2, 3, . . . , denotes an event of an n-th target sensing unit.

The n-th spatiotemporal correlator may increase a previous internal state value $Q_n(t_{prev})$ in response to an event being inputted from a single target sensing unit from among sensing units of a corresponding receptive field at a point of time "t". A degree of the increase may be affected by a weight set for the target sensing unit from which the event occurs. Accordingly, in response to a plurality of events being simultaneously input, a speed of the increase may correspondingly accelerate. Differing weights may be set among a plurality of target sensing units.

The first to n-th spatiotemporal correlators 312, 314, and 316 may output output values differing based on a fluctuation of spatiotemporal correlations to the movement trajectory tracking unit 320. For example, the n-th spatiotemporal correlator may determine that a spatiotemporal correlation amongst target sensing units outputting events to the n-th spatiotemporal correlator is high and output "1" in response to an internal state value $Q_n(t)$ exceeding a predetermined threshold value $\phi$, the n-th spatiotemporal correlator may determine that a spatiotemporal correlation is low and output zero when the internal state value $Q_n(t)$ is less than or equal to the predetermined threshold value $\phi$. "1" may be outputted in a form of "high" or "true", and zero may be outputted in a form of "low" or "false". Alternatively, in response to an output of the n-th spatiotemporal correlator being "1", the n-th spatiotemporal correlator may reduce an internal state value of the n-th spatiotemporal correlator 121-n by a predetermined value.

The internal state value $Q_n(t)$ calculated by the n-th spatiotemporal correlator may indicate a spatial correlation and a temporal correlation of events inputted to the n-th spatiotemporal correlator from target sensing units. For example, in response to a series of events being successfully inputted to the n-th spatiotemporal correlator from a single target sensing unit, an internal state value $Q_n(t)$ may indicate a temporal correlation amongst the inputted events. In response to two events being simultaneously inputted to the n-th spatiotemporal correlator from two target sensing units, for example, in response to two target sensing units being adjacent to each other and connected to an identical n-th spatiotemporal correlator, the two events may have a high level of spatial correlation. The two events may also have a temporal correlation because the two events are simultaneously inputted from the two target sensing units.

The first to n-th spatiotemporal correlators 312, 314, and 316 may have a spatial correlation differing from one another.

FIG. 5 is a diagram illustrating a spatial correlation amongst first to n-th spatiotemporal correlators according to an exemplary embodiment.

Referring to FIG. 5, the vision sensor 110 may be logically divided into a plurality of receptive fields. The plurality of divided receptive fields may overlap at least one neighboring area. The first to n-th spatiotemporal correlators 312, 314, and 316 may be mapped to the plurality of divided receptive fields of the vision sensor 110. Sensing units disposed in the plurality of divided receptive fields may output an event to a corresponding spatiotemporal correlator from among the first to n-th spatiotemporal correlators 312, 314, and 316.

In FIG. 5, C(i, j) denotes center coordinates of a receptive field disposed at a center of the vision sensor 110. C(i−1, j) denotes center coordinates of a receptive field that moves towards an "x" axis direction, for example, a horizontal direction, by a degree of "1". In FIG. 4, "1" may indicate spacing by a degree of three pixels, and the degree of spacing may be subject to change.

As shown in FIG. 5, an overlapping portion of the receptive fields may indicate that an identical event may be simultaneously outputted to at least two spatiotemporal correlators. A spatial correlation may be given among the first to n-th correlators 312, 314, and 316 or a spatial correlation may be given among the receptive fields due to the overlapping portion of the receptive fields. The spatiotemporal correlation among the first to n-th spatiotemporal correlators 312, 314, and 316 may affect tracking a movement trajectory.

Referring to FIG. 3, the movement trajectory tracking unit 320 may track a movement trajectory of a movement-occurring part based on output values of spatiotemporal correlations calculated from the first to n-th spatiotemporal correlators 312, 314, and 316, respectively, and internal state values of the first to n-th spatiotemporal correlators.

The movement trajectory tracking unit 320 may generate a single cluster by grouping spatiotemporal correlators having a high spatiotemporal correlation from among the first to n-th spatiotemporal correlators 312, 314, and 316. The movement trajectory tracking unit 320 may group spatiotemporal correlators that output "1" from among the first to n-th spatiotemporal correlators 312, 314, and 316 based on overlapping of receptive fields. The movement trajectory tracking unit 320 may generate a single cluster by grouping overlapping spatiotemporal correlators. Outputting "1" may indicate having a high spatiotemporal correlation.

The movement trajectory tracking unit 320 may generate a cluster by grouping spatiotemporal correlators of which an output is "1", and set a predetermined area including the cluster to be a clustering area.

Figure 6:
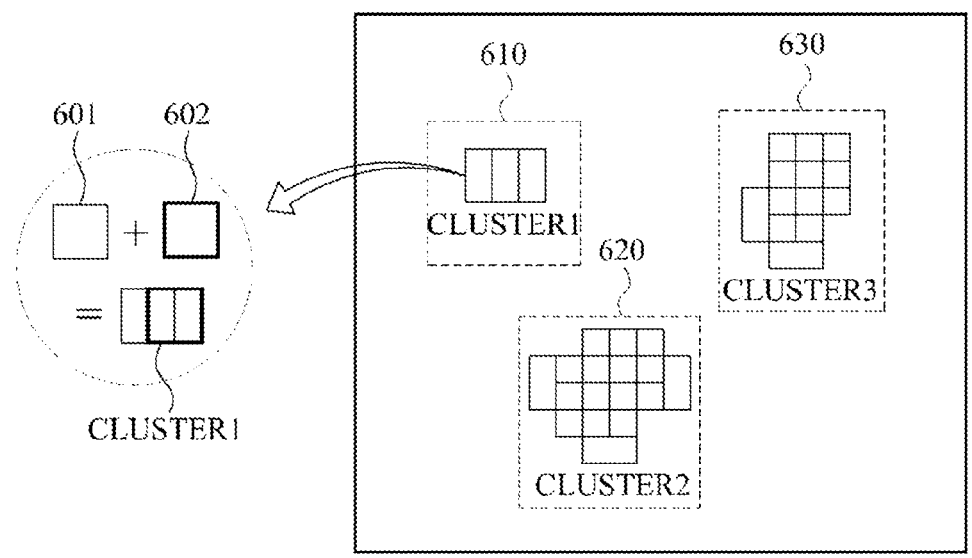
FIG. 6 is a diagram which illustrates an example of generating first to third clusters by grouping first to n-th spatiotemporal correlators and setting clustering areas according to an exemplary embodiment.

FIG. 6 is a diagram which illustrates an example of generating first to third clusters by grouping first to n-th spatiotemporal correlators and setting clustering areas according to an exemplary embodiment.

Referring to FIG. 6, the first cluster, hereinafter also referred to as "cluster 1", may be generated by grouping two receptive fields 601 and 602 overlapping each other. The second cluster, hereinafter also referred to as a "cluster 2", may be generated by grouping ten overlapping receptive fields. The third cluster, hereinafter also referred to as a "cluster 3", may be generated by grouping seven overlapping receptive fields.

A first clustering area 610 may refer to a predetermined area including the cluster 1. A second clustering area 620 may refer to a predetermined area including the cluster 2. A third clustering area 630 may refer to a predetermined area including the cluster 3. A clustering area may be generated based on a center of a cluster.

The movement trajectory tracking unit 320 may calculate a center of a clustering area to be a location of an object. The movement trajectory tracking unit 320 may calculate the center of the clustering area based on internal state values of spatiotemporal correlators within the clustering area.

The movement trajectory tracking unit 320 may re-calculate a center of a previous clustering area based on internal state values of spatiotemporal correlators within the previous clustering area in an absence of spatiotemporal correlators of which an output is "1", and calculate the re-calculated center of the previous clustering area to be a location of an object.

The movement trajectory tracking unit 320 may track a movement trajectory in conjunction with the calculated location of the object and the re-calculated location of the object. The cluster may have a form which corresponds to a movement-occurring part.

The movement trajectory tracking unit 320 may multiply a location of a plurality of spatiotemporal correlators included in a clustering area and a constant, and determine an average value of the multiplication to be a center of a clustering area. The location of the spatiotemporal correlators may be a location representative of an area covered by the spatiotemporal correlator. The constant may include various values, for example, an internal state value Q(t) calculated from the spatiotemporal correlators and a number of events inputted to the spatiotemporal correlators during a predetermined period of time.

For example, a clustering area is generated by grouping the first and second spatiotemporal correlators 312 and 314, and an internal state value of the first spatiotemporal correlator 312 is Q1, and an internal state value of the second spatiotemporal correlator 314 is Q2. A location representative of the first spatiotemporal correlator 312 corresponds to (x1, y1), and a location representative of the second spatiotemporal correlator 314 corresponds to (x2, y2). The movement trajectory tracking unit 320 may calculate a center of the clustering area based on Equation 2.

$$x' = \frac{(Q1 \times x1) + (Q2 \times x2)}{Q1 + Q2}$$

$$y' = \frac{(Q1 \times y1) + (Q2 \times y2)}{Q1 + Q2}$$

[Equation 2]

In Equation 2, "x" denotes an "x" coordinate of a center of a clustering area, and "y" denotes a "y" coordinate of a center of a clustering area.

Figure 7:
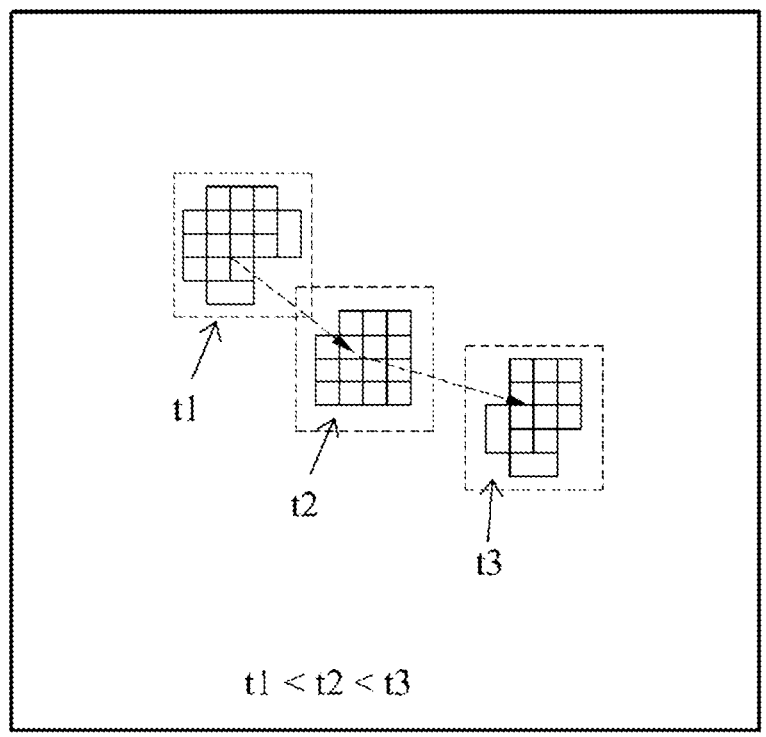
FIG. 7 is a diagram which illustrates an example of tracking a movement trajectory of a movement-occurring part based on generated clustering areas according to an exemplary embodiment.

FIG. 7 is a diagram which illustrates an example of tracking a movement trajectory of a movement-occurring part based on generated clustering areas according to an exemplary embodiment.

The movement trajectory tracking unit 320 may generate a clustering area, or calculate a center of the clustering area at predetermined intervals. Referring to FIG. 7, the movement trajectory tracking unit 320 may generate a clustering area at sequential points of time "t1", "t2", and "t3", and calculate a center of the clustering area. The movement trajectory tracking unit 320 may track a movement trajectory in conjunction with the calculated center. A movement trajectory of a movement-occurring part may be tracked by calculating locations of grouped spatiotemporal correlators; for example, grouped receptive fields.

Referring to FIG. 3, the motion pattern determination unit 330 may determine a motion pattern of the movement-occurring part from the movement trajectory tracked by the movement trajectory tracking unit 320. The motion pattern determination unit 330 may obtain feature components for representing a motion pattern from the tracked movement trajectory and compare the feature components to motion patterns stored in the pattern storage unit 340, e.g. the pattern storage, to determine the motion pattern of the movement-occurring part. The feature components may include various parameters, for example, a location of a cluster, a direction in which the cluster moves, and a movement angle of the cluster.

The pattern storage unit 340 may store values of a plurality of feature components and motion patterns which correspond to the plurality of feature components.

Referring to FIG. 1, the second motion determination unit 140 may detect a movement direction in which an object moves based on events outputted from the vision sensor 110.

Figure 8:
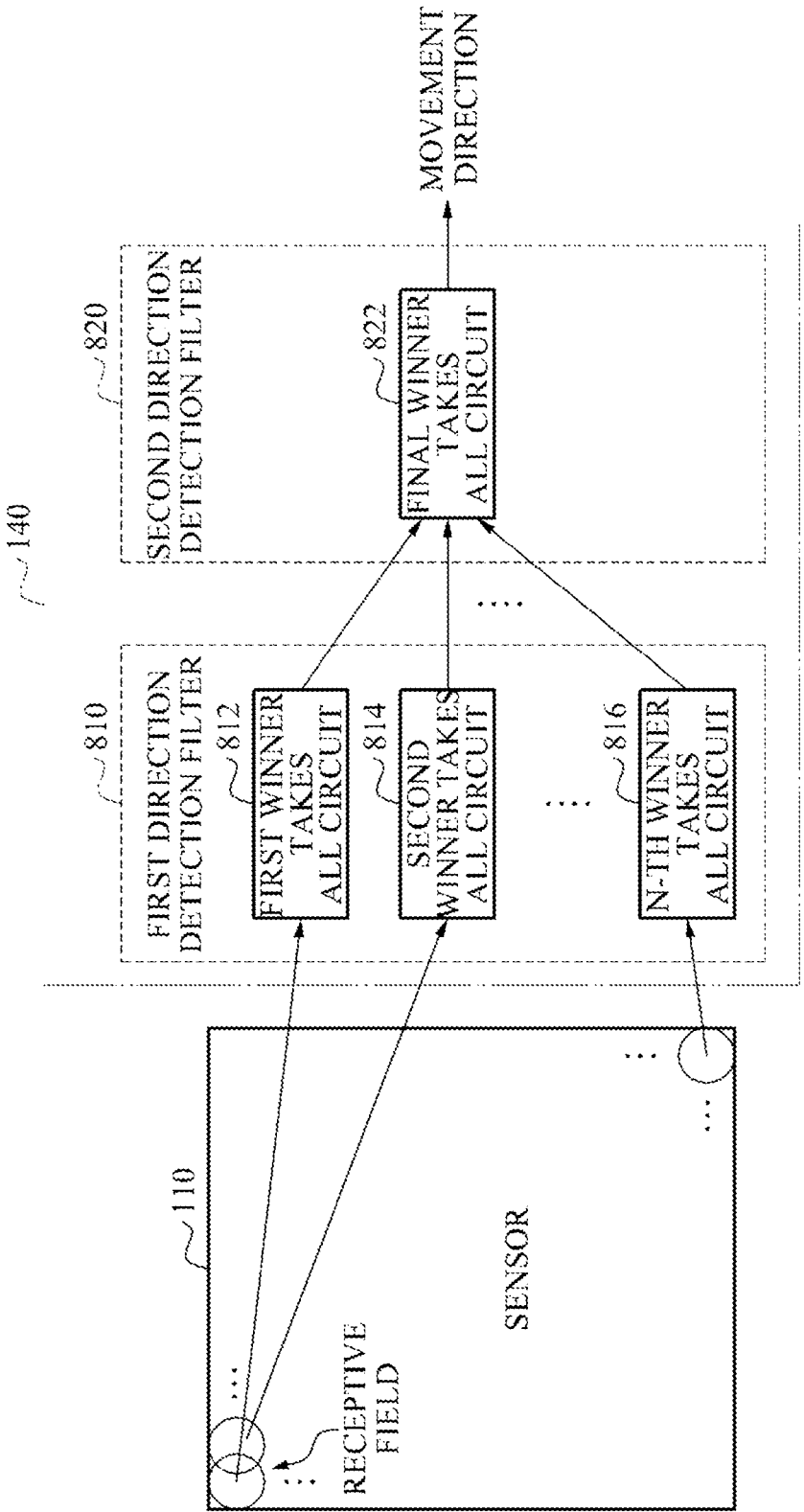
FIG. 8 is a diagram which illustrates an example of a configuration of a second motion determination unit according to an exemplary embodiment.

FIG. 8 is a diagram which illustrates an example of a configuration of the second motion determination unit 140 according to an exemplary embodiment.

Referring to FIG. 8, the second motion determination unit 140 includes a first direction detection filter 810 and a second direction detection filter 820.

The first direction detection filter 810 may detect a movement direction in which an object moves for a plurality of receptive fields based on events outputted from the vision sensor 110.

The first direction detection filter 810 includes winner takes all circuits 812, 814, and 816 of which a number, at a minimum, corresponds to a number of receptive fields. The winner takes all circuits 812, 814, and 816 may receive an event from a corresponding receptive field and detect a movement direction in which an object moves within the corresponding receptive field.

The second direction detection filter 820 may detect a final movement direction of the object based on the movement direction detected for each of the receptive fields via the first direction detection filter 810.

The second direction detection filter 820 includes at least one final winner takes all circuit 822. The winner takes all circuit 822 may receive movement direction information related to an object from a corresponding receptive field detected for each of the winner takes all circuits 812, 814, and 816, and determine the final movement direction based on the vision sensor 110.

The second direction detection filter 820 may be implemented absent a winner takes all circuit.

The second direction detection filter 820 may calculate a vector sum of the movement direction information of the corresponding receptive field detected for each of the winner takes all circuits 812, 814, and 816 inputted from the first direction detection filter 810, and calculate the final movement direction based on the vision sensor 110.

In FIG. 8, the second motion determination unit 140 is implemented by two direction detection filters having a hierarchical structure, however, the second motion determination unit 140 may be implemented by a greater number of direction detection filters having a hierarchical structure.

The second motion determination unit 140 may detect a movement direction using a direction detection filter having a hierarchical structure. However, various changes and modifications of the filter may be made to also detect a movement, for example, using a filter for detecting a predetermined shape.

A method of configuring the winner takes all circuits 812, 814, and 816 and the final winner takes all circuit 822 will be discussed with reference to FIG. 9 or FIG. 10.

FIG. 9 is a diagram which illustrates an example of a winner takes all circuit according to an exemplary embodiment.

Referring to FIG. 9, the winner takes all circuit includes four neurons 910, 920, 930, and 940 for detecting a direction and an inhibitory neuron 950.

Each of the neurons 910, 920, 930, and 940 may receive an event inputted from a corresponding receptive field, apply a greater weight to an event in a direction detected by a corresponding neuron, and calculate an internal state value by calculating a sum of events to which the greater weight is applied.

Each of the neurons 910, 920, 930, and 940 may output a signal which indicates that a movement is detected in a corresponding direction in response to the internal state value exceeding a predetermined threshold value.

In response to an output being generated from among the neurons 910, 920, 930, and 940, the inhibitory neuron 950 may inhibit neurons from generating an output, aside from a neuron generating an initial output.

Each of the neurons 910, 920, 930, and 940 may detect four directions by detecting a single direction in an example of FIG. 9.

Figure 10:
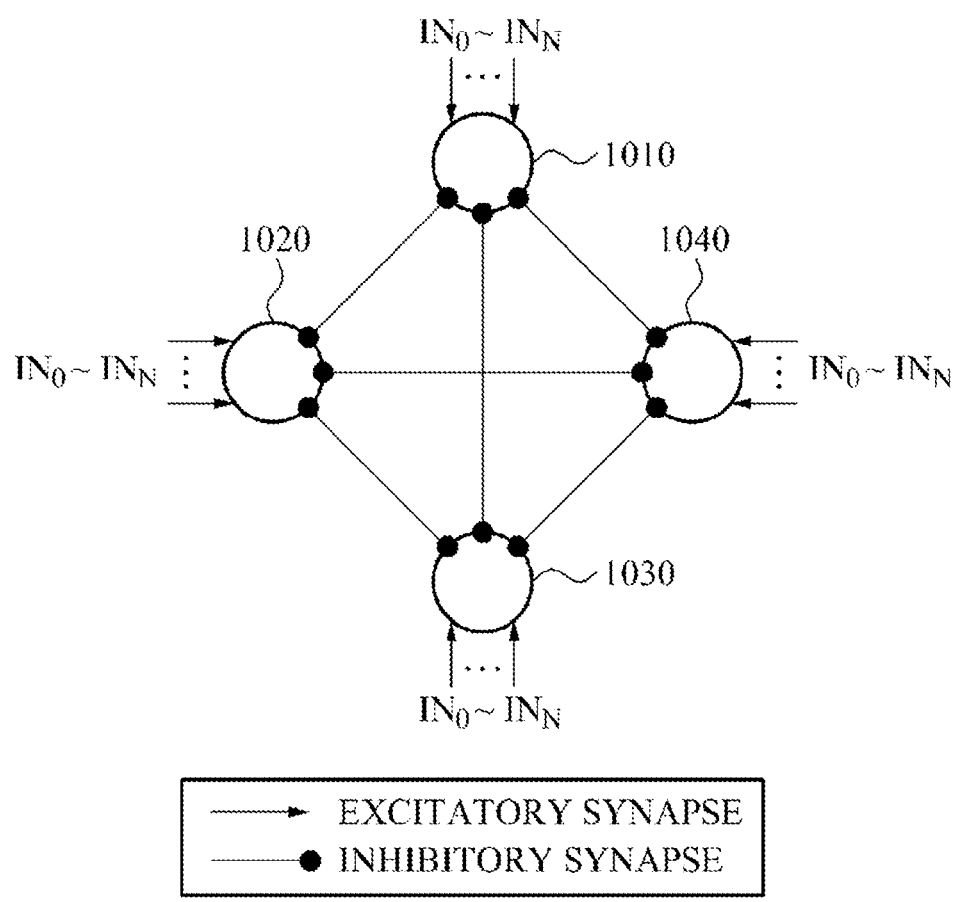
FIG. 10 is a diagram which illustrates another example of a winner takes all circuit according to an exemplary embodiment.

FIG. 10 is a diagram which illustrates another example of a winner takes all circuit according to an exemplary embodiment.

Referring to FIG. 10, the winner takes all circuit includes four neurons 1010, 1020, 1030, and 1040 for detecting a direction.

Each of the neurons 1010, 1020, 1030, and 1040 may receive an input of an event from a corresponding receptive field, apply a greater weight to an event in a direction allocated to a corresponding neuron, and calculate an internal state value by calculating a sum of events to which the greater weight is applied.

Each of the neurons 1010, 1020, 1030, and 1040 may output a signal which indicates that a movement is detected in a corresponding direction in response to the internal state value exceeding a predetermined threshold value.

In response to a neuron outputting the signal which indicates that the movement is detected in the corresponding direction occurring from among the neurons 1010, 1020, 1030, and 1040, the neuron outputting the signal may receive an output and generation of a subsequent output may be inhibited.

The neurons may inhibit one another from generating an output, aside from a neuron generating an initial output.

Each of the neurons 1010, 1020, 1030, and 1040 may detect four directions by detecting a single direction in an example of FIG. 10.

Referring to FIG. 3, a receptive field, for example, a unit providing an event to each of the winner takes all circuits 812, 814, and 816, may be implemented in various forms. However, an example of FIG. 11 will be provided herein.

Figure 11:
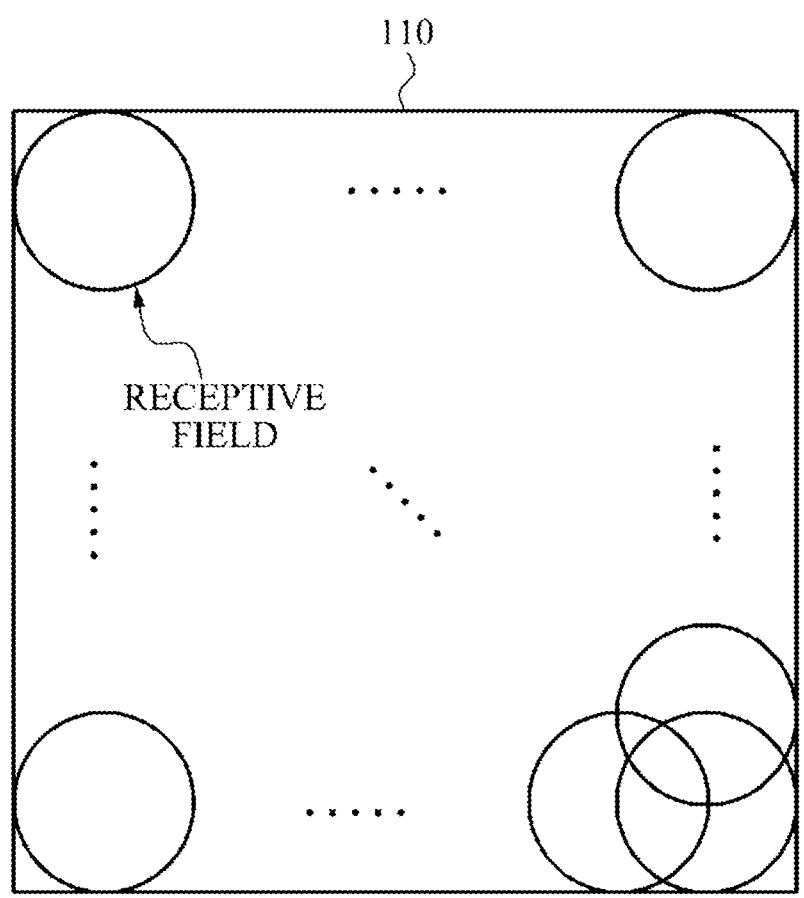
FIG. 11 is a diagram which illustrates a form of a receptive field for detecting a movement direction according to an exemplary embodiment.

FIG. 11 is a diagram which illustrates a form of a receptive field for detecting a movement direction according to an exemplary embodiment.

Referring to FIG. 11, the form of the receptive field is provided in a circular form because directivity towards a predetermined direction may occur due to the form of the receptive field. Accordingly, receptive fields of events inputted to the winner takes all circuits 812, 814, and 816 may be set to be circular receptive fields.

Figure 12:
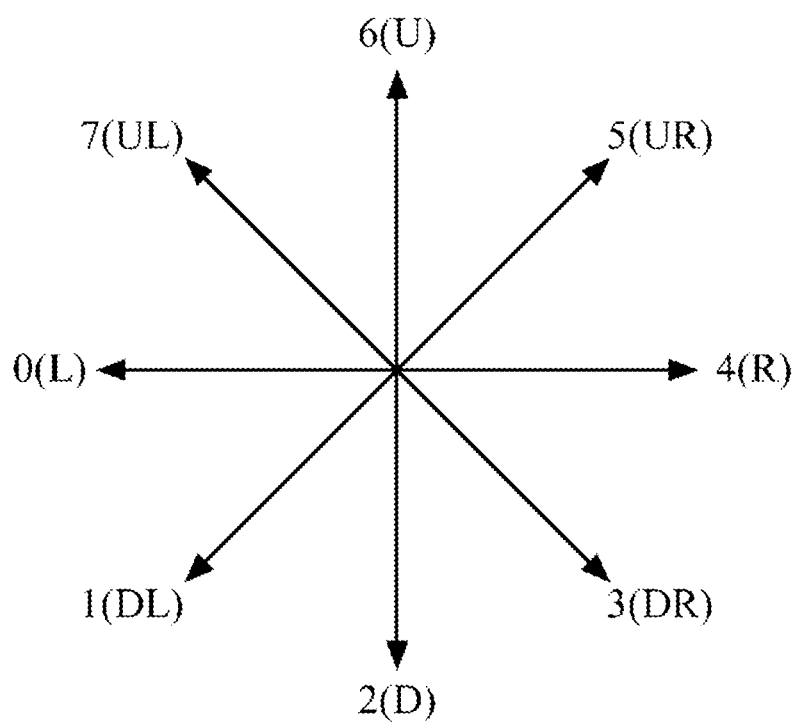
FIG. 12 is a diagram which illustrates detected directions in response to a winner takes all circuit detects eight directions according to an exemplary embodiment.

The winner takes all circuits 812, 814, and 816 and the final winner takes all circuit 822 may detect movements in eight directions as shown in FIG. 12 through use of eight neurons detecting differing directions. However, directions of the winner takes all circuits 812, 814, and 816 and the final winner takes all circuit 822 may be predetermined.

FIG. 12 is a diagram illustrating detected directions when a winner takes all circuit detects eight directions according to an exemplary embodiment.

Referring to FIG. 12, the winner takes all circuits 812, 814, and 816 and the final winner takes all circuit 822 may detect movements towards eight directions represented in indices of "0" through "7".

In FIG. 12, "0" indicates a movement towards a left, "1" indicates a movement towards a downward left, "2" indicates a downward movement, "3" indicates a movement towards a downward right, "4" indicates a movement towards a right, "5" indicates a movement toward an upward right, "6" indicates an upward movement, and "7" indicates a movement towards an upward left.

Figure 13:
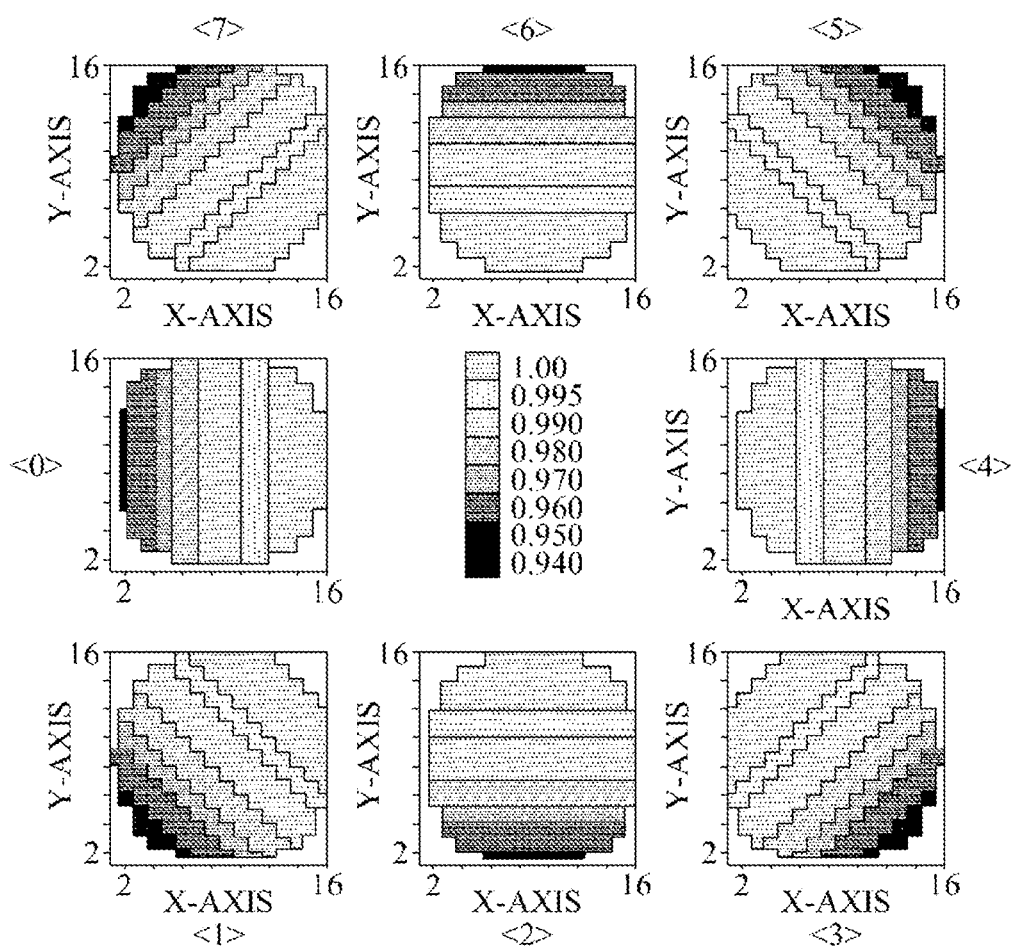
FIG. 13 is a diagram which illustrates an example of weights applied to a plurality of neurons of a winner takes all circuit included in a first direction detection filter according to an exemplary embodiment.

In response to the winner takes all circuits 812, 814, and 816 detecting eight directions as shown in FIG. 12, a weight to be applied to a receptive field connected to each of neurons detecting the directions may be set, as illustrated in FIG. 13.

FIG. 13 is a diagram which illustrates an example of weights applied to a plurality of neurons of a winner takes all circuit included in a first direction detection filter according to an exemplary embodiment.

Referring to FIG. 13, shading may indicate a degree of weight, and a weight to be applied to a receptive field connected to each neuron in a direction which corresponds to the index of FIG. 12 may have a gradient value based on the direction.

Figure 14:
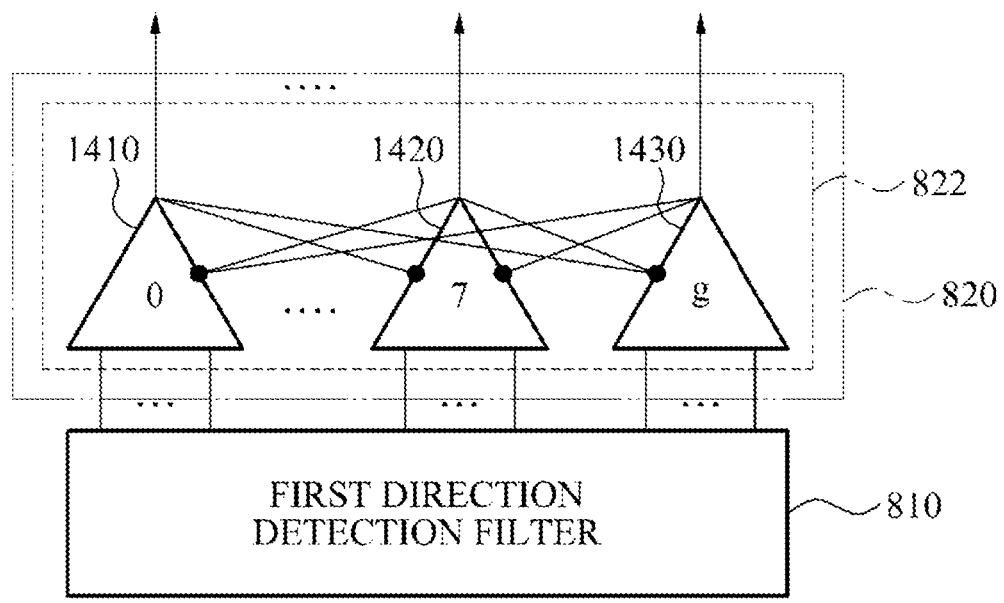
FIG. 14 is a diagram which illustrates an example of a configuration of a winner takes all circuit included in a second direction detection filter according to an exemplary embodiment.

In response to the second motion determination unit 140 determining a movement in eight directions, a configuration of the final winner takes all circuit 822 may be illustrated, as in FIG. 14.

FIG. 14 is a diagram which illustrates an example of a configuration of a winner takes all circuit included in a second direction detection filter according to an exemplary embodiment.

Referring to FIG. 14, the final winner takes all circuit 822 includes nine neurons 1410, 1420 and 1430.

Each of the neurons 1410, 1420, and 1430 may receive movement direction information detected for each of the winner takes all circuits 812, 814, and 816, apply a greater weight to a direction allocated to a corresponding neuron, and calculate an internal state value of the neurons 1410, 1420, and 1430.

Each of the neurons 1410, 1420, and 1430 may output a signal indicating that a movement is detected in a corresponding direction in response to the internal state value exceeding a predetermined threshold value.

The neurons 1410, 1420, and 1430 may inhibit one another from generating an output, aside from a neuron generating an initial output.

The neuron (0) 1410 to the neuron (7) 1420 may refer to a neuron detecting a movement towards a direction corresponding to the index represented in FIG. 12.

The neuron (g) 1430 may refer to a neuron detecting an instance in which an occurrence frequency of an event is greater than a reference value, or a movement is not in a predetermined direction.

In response to the occurrence frequency of the event being greater than the reference value, or the movement not being in the predetermined direction, the movement may be a movement of a hand moving back and forth based on the vision sensor 110, or a circling movement.

Figure 15:
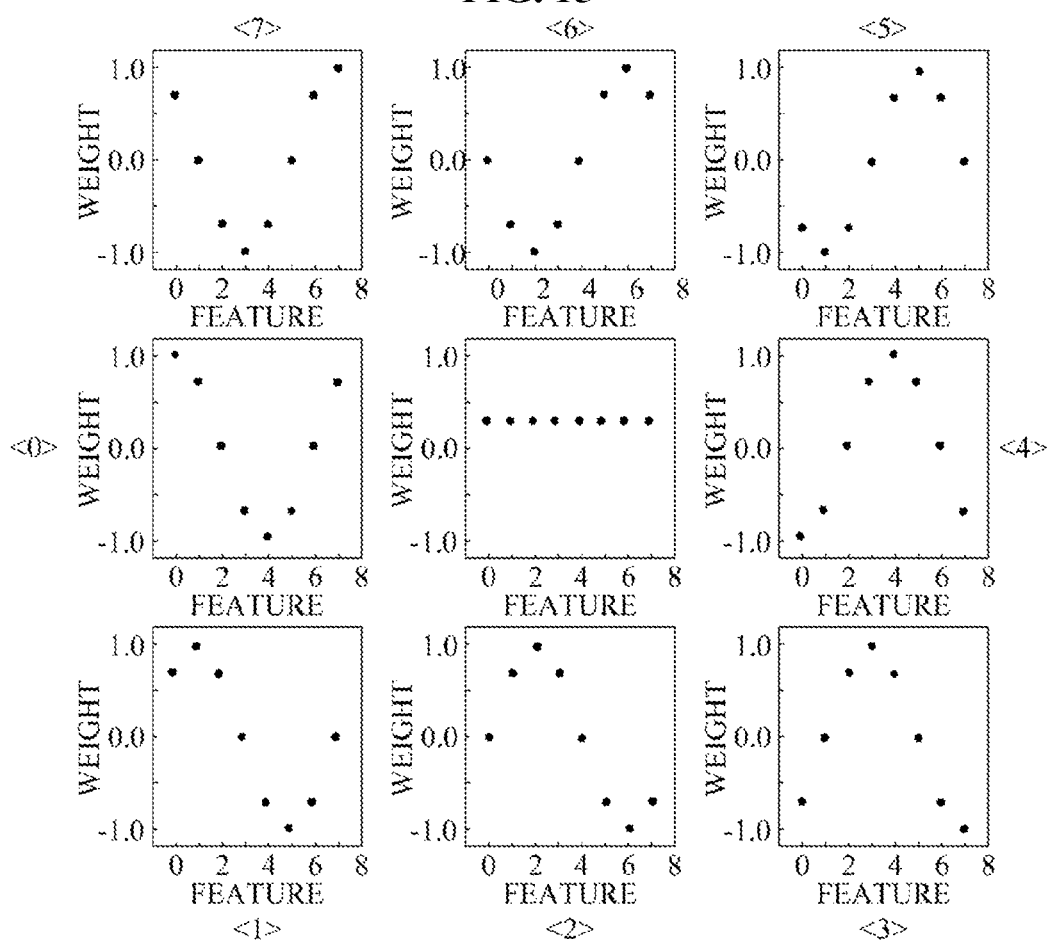
FIG. 15 is a diagram which illustrates an example of weights applied to a plurality of neurons of a winner takes all circuit included in a second direction detection filter according to an exemplary embodiment.

In response to the final winner takes all circuit 822 detecting eight directions as shown in FIG. 12, a weight to be applied to movement direction information detected for each of the winner takes all circuits 812, 814, and 186 inputted to neurons detecting the directions may be set, as shown in FIG. 15.

FIG. 15 is a diagram which illustrates an example of weights applied to a plurality of neurons of a winner takes all circuit included in a second direction detection filter, according to an exemplary embodiment.

Referring to FIG. 15, the more similar to a corresponding direction, the higher the weight to be applied to the movement direction information detected for each of the winner takes all circuits 812, 814, and 816 inputted to the neurons 1410, 1420, and 1430 included in the final winner takes all circuit 822, and the more opposite to the corresponding direction, the lower the weight to be applied.

However, the neuron (g) 1430 may apply an identical weight to all directions because a direction to be detected is non-existent.

The winner takes all circuits 812, 814, and 816 included in the second motion determination unit 140 may be classified among a plurality of types of events outputted from the vision sensor 110.

For example, in response to a type of event outputted from the vision sensor 110 including an ON event and an OFF event, the second motion determination unit 140 may include a configuration of detecting a movement direction based on the ON event separate from a configuration of detecting a movement direction based on the OFF event, and may determine a final movement direction by integrating the movement direction detected based on the ON event and the movement direction detected based on the OFF event.

Figure 16:
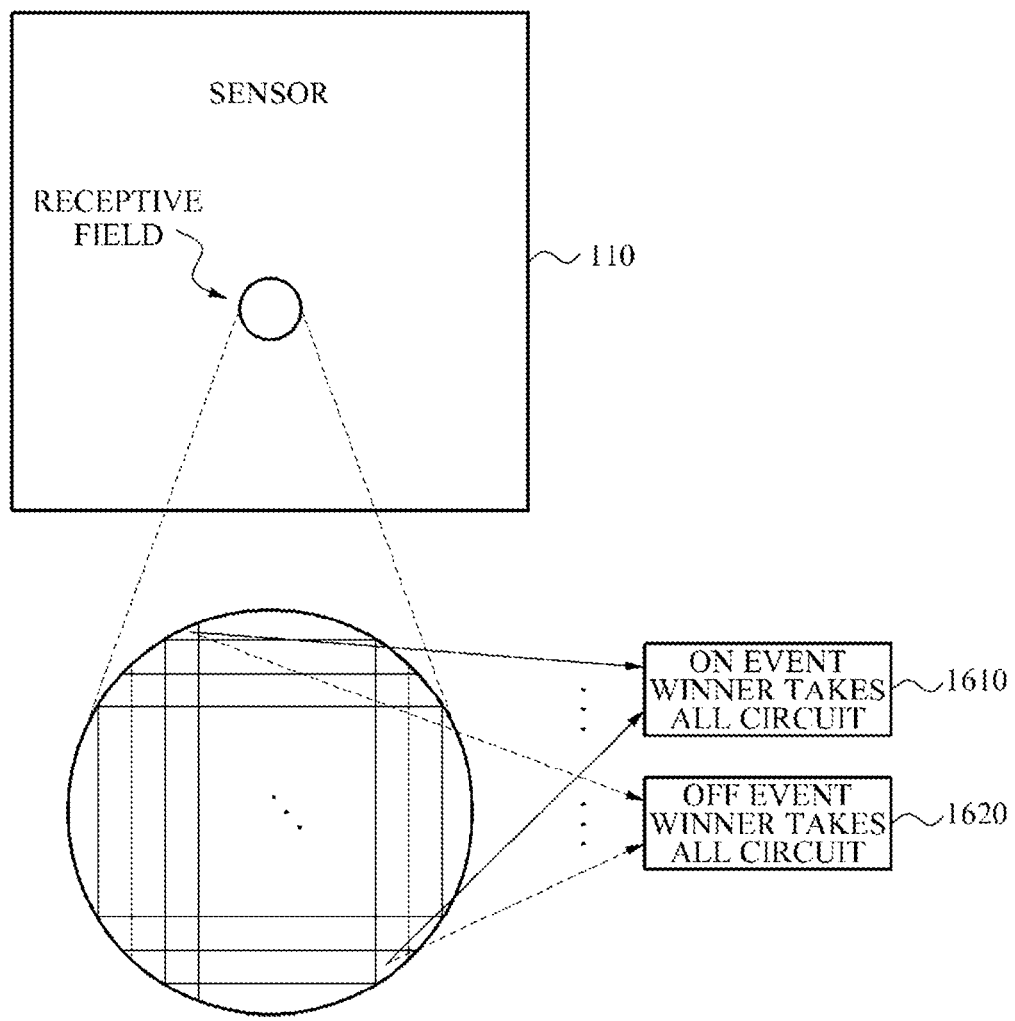
FIG. 16 is a diagram which illustrates an example of a configuration of a winner takes all circuit based on a type of events received via a vision sensor according to an exemplary embodiment.

FIG. 16 is a diagram which illustrates an example of a configuration of a winner takes all circuit based on a type of events received via a vision sensor, according to an exemplary embodiment.

Referring to FIG. 16, in response to types of events outputted from the vision sensor 110 including an ON event and an OFF event, an ON event of a receptive field may be inputted to an ON event winner takes all circuit 1610, and an OFF event of a receptive field may be inputted to an OFF event winner takes all circuit 1620.

Referring to FIG. 1, the third motion determination unit 145 may calculate a rate of an OFF event to an ON event in response to a type of movement being a small movement and may compare the rate to at least one predetermined reference value to determine a forward movement or a backward movement of an object.

The third motion determination unit 145 may determine the type of movement to be a forward movement in response to the ON event occurrence frequency/OFF event occurrence frequency being greater than a first reference value, and may determine the type of movement to be a backward movement in response to the ON event occurrence frequency/OFF event occurrence frequency being less than a second reference value in a state of increasing light. The first reference value is greater than "1", and the second reference value is less than "1".

The third motion determination unit 145 may determine the type of movement to be a backward movement in response to the ON event occurrence frequency/OFF event occurrence frequency being greater than the first reference value, and may determine the type of movement to be a forward movement in response to the ON event occurrence frequency/OFF event occurrence frequency being less than the second reference value in a state of diminishing light. The first reference value is greater than "1", and the second reference value is less than "1".

The first motion determination unit 130 and the third motion determination unit 145 may both use a small movement, and one of the first motion determination unit 130 and the third motion determination unit 145 may operate based on a user setting.

The motion control unit 150 may output a control instruction for controlling a device (not shown) to the device based on a motion pattern determined by the first motion determination unit 130 or a movement direction determined by the second motion determination unit 140. The device may be disposed at a location at which wired/wireless communication with the apparatus 100 for recognizing the motion is available, or the apparatus 100 for recognizing the motion may be disposed inside the device.

Hereinafter, a method of recognizing motion using an event-based vision sensor according to the aforementioned configuration will be described with reference to the drawings.

Figure 17:
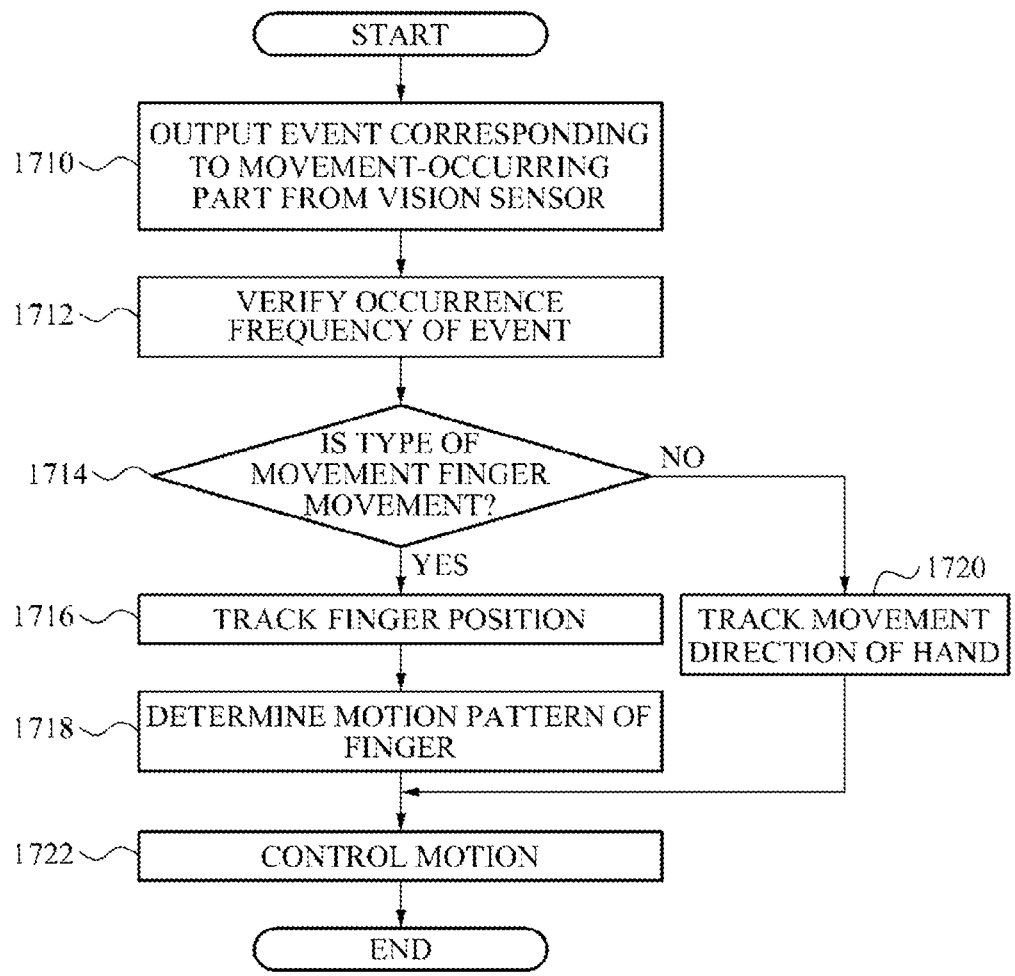
FIG. 17 is a flowchart which illustrates an operation of an apparatus for recognizing motion according to an exemplary embodiment.

FIG. 17 is a flowchart illustrating an operation of an apparatus 100 for recognizing motion according to an exemplary embodiment.

Referring to FIG. 17, in operation 1710, the apparatus 100 for recognizing the motion may output an event which corresponds to a movement-occurring part from a vision sensor.

In operation 1712, the apparatus 100 for recognizing the motion may verify an occurrence frequency of an event.

In operation 1714, the apparatus 100 for recognizing the motion may compare the occurrence frequency of the event to a predetermined threshold value, and verify whether a type of movement is a small movement, such as, a finger movement. A verification method includes determining the type of movement to be a finger movement in response to the occurrence frequency of the event being less than the predetermined threshold value, and determining the type of movement to be a whole hand movement in response to the occurrence frequency being greater than the predetermined threshold value.

In response to a result of operation 1714 is verified to be the finger movement, the apparatus 100 for recognizing the motion may track a position of the finger, and calculate a movement trajectory of the finger, in operation 1716.

In operation 1718, the apparatus 100 for recognizing the motion may determine a motion pattern of the finger of a movement-occurring part from the movement trajectory of the finger.

In response to a result of operation 1714 being verified to be the whole hand movement, the apparatus 100 for recognizing the motion may track a movement direction of the hand, in operation 1720.

Subsequent to operation 1718 or operation 1720, the apparatus 100 for recognizing the motion may output a control instruction to control a device based on the determined motion pattern or the determined movement direction in operation 1722.

Figure 18:
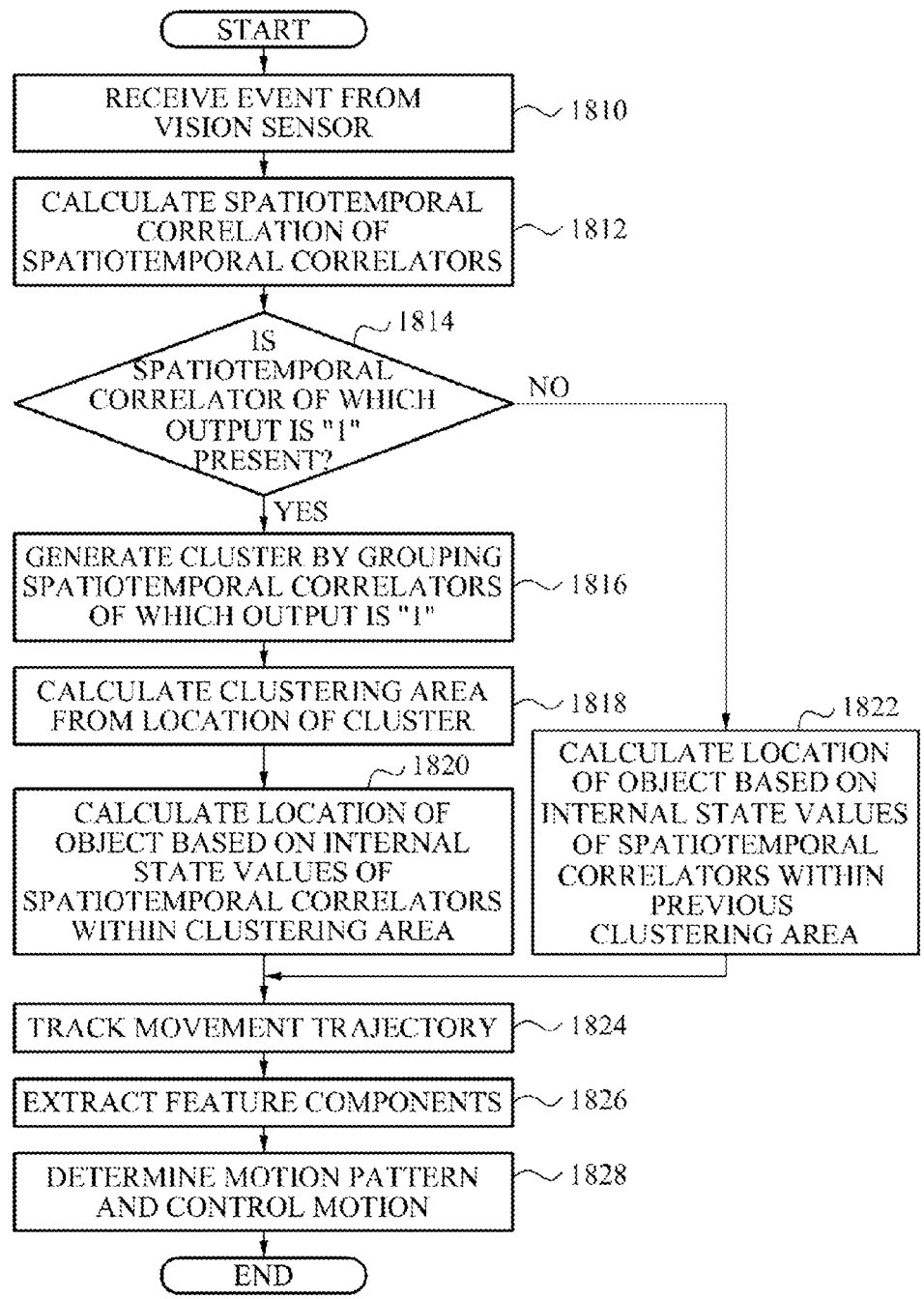
FIG. 18 is a flowchart which illustrates an operation of recognizing motion of a finger according to an exemplary embodiment.

FIG. 18 is a flowchart illustrating an operation of recognizing motion of a finger according to an exemplary embodiment.

Referring to FIG. 18, in operation 1810, the apparatus 100 for recognizing the motion may receive an event from the vision sensor 110. In operation 1812, the apparatus 100 for recognizing the motion may calculate a spatiotemporal correlation of spatiotemporal correlators based on the received event.

In operation 1814, the apparatus 100 for recognizing the motion may verify a presence of a spatiotemporal correlator of which an output is "1".

When the spatiotemporal correlator of which the output is "1" is verified to be present as a result of operation 1814, the apparatus 100 for recognizing the motion may generate a cluster by grouping spatiotemporal correlators of which an output is "1" in operation 1816.

In operation 1818, the apparatus 100 for recognizing the motion may set a clustering area from a location of a cluster. The clustering area may correspond to a predetermined area including the cluster, and may be a predetermined area expanding from a center.

In operation 1820, the apparatus 100 for recognizing the motion may calculate the center of the clustering area based on internal state values of spatiotemporal correlators within the clustering area, and calculate the center of the clustering area to be a location of an object.

In response to the spatiotemporal correlator of which the output is "1" being verified to be absent as a result of operation 1814, the apparatus 100 for recognizing the motion may re-calculate the center of the clustering area based on the internal state values of the spatiotemporal correlators within the previous clustering area, and calculate the re-calculated center of the clustering area to be the location of the object in operation 1820. As used herein, the previous clustering area may refer to a most recently set clustering area.

Subsequent to operation 1820 or operation 1822, the apparatus 100 for recognizing the motion may track a movement trajectory in conjunction with the previously calculated location of the object in operation 1824.

In operation 1826, the apparatus 100 for recognizing the motion may extract feature components for representing a motion pattern from the tracked movement trajectory. The feature components may include various parameters, for example, a location of a cluster, a movement direction of a cluster, and a movement angle of a cluster.

In operation 1828, the apparatus 100 for recognizing the motion may compare feature components to stored motion patterns, determine a motion pattern of a movement-occurring part, and output a control instruction for controlling a device based on the determined motion pattern.

Figure 19:
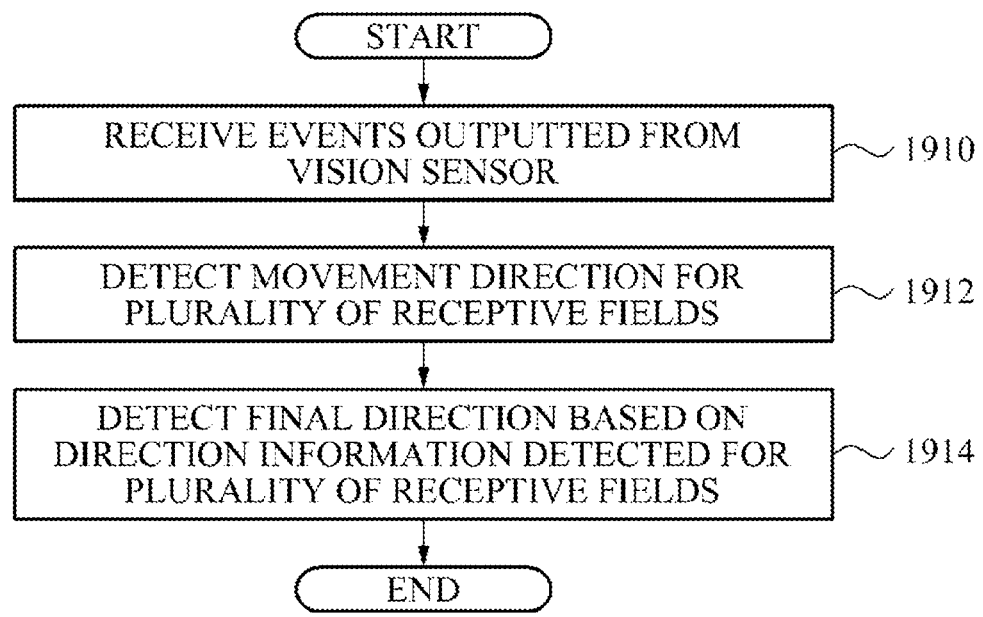
FIG. 19 is a flowchart which illustrates an operation of detecting a movement direction of a hand according to an exemplary embodiment.

FIG. 19 is a flowchart which illustrates an operation of detecting a movement direction of a hand according to an exemplary embodiment.

Referring to FIG. 19, in operation 1910, the apparatus 100 for recognizing the motion may receive an event from the vision sensor 110. In operation 1912, the apparatus 100 for recognizing the motion may detect a movement direction of an object for a plurality of receptive fields based on events outputted from the vision sensor 110. The receptive fields may be provided in a circular form in order to avoid predetermined directivity based on the form of the receptive fields.

In operation 1914, the apparatus 100 for recognizing the motion may detect a final movement direction, for example, a movement direction of an object based on the vision sensor 110, based on direction information detected for the plurality of receptive fields.

Exemplary embodiments include computer-readable storage media including program instructions to implement various operations embodied by a computer. The media may also include, alone or in combination with the program instructions, data files, data structures, tables, and the like. The media and program instructions may be those specially designed and constructed for the purposes of the exemplary embodiments, or they may be of the kind well known and available to those having skill in the computer software arts. Examples of computer-readable media include magnetic media such as hard disks, floppy disks, and magnetic tape; optical media such as CD ROM discs; magneto-optical media such as floptical discs; and hardware devices that are specially configured to store and perform program instructions, such as read-only memory devices (ROM) and random access memory (RAM). Examples of program instructions include both machine code, such as produced by a compiler, and files containing higher level code that may be executed by a computer using an interpreter. The described hardware devices may be configured to act as one or more software modules in order to perform the operations of the above-described exemplary embodiments, or vice versa.

Although a few exemplary embodiments have been shown and described, the exemplary embodiments are not limited to the described embodiments. Instead, it would be appreciated by those skilled in the art that changes may be made to these exemplary embodiments without departing from the principles and spirit of the disclosure, the scope of which is defined by the claims and their equivalents.

The invention claimed is:

1. An apparatus for recognizing motion using an event-based vision sensor, the apparatus comprising:
 a vision sensor configured to sense a movement-occurring part and output events;
 a movement type determiner configured to determine a type of movement using a frequency of occurrence of the events outputted through the vision sensor;
 a first motion determiner configured to track a movement trajectory of the movement-occurring part and determine a motion pattern based on the tracked movement trajectory in response to a result of the movement type determiner indicating a small movement;
 a second motion determiner configured to determine a direction of movement in which an object moves based on the output events in response to a result of the movement type determination indicating a large movement; and
 a motion controller configured to output a control instruction to control a device based on the motion pattern determined by the first motion determiner or the movement direction determined by the second motion determiner.

2. The apparatus of claim 1, wherein the movement type determiner is configured to calculate an occurrence frequency of the events outputted through the vision sensor and compares the occurrence frequency to a predetermined threshold value to determine the occurrence frequency to be a small movement in which a portion of an object moves in response to the occurrence frequency being less than the threshold value, and determine the occurrence frequency to be a large movement in which a whole of the object moves in response to the occurrence frequency being greater than or equal to the threshold value.

3. The apparatus of claim 1, wherein the first motion determiner comprises:
 spatiotemporal correlators which correspond to a plurality of predetermined receptive fields of the vision sensor that receive inputs of events outputted from the predetermined receptive fields and calculate a spatiotemporal correlation for each of the predetermined receptive fields;
 a movement trajectory tracker configured to track a movement trajectory of the movement-occurring part based on a fluctuation in a spatiotemporal correlation of the predetermined receptive fields; and
 a motion pattern determiner configured to determine a motion pattern of the movement-occurring part from the tracked movement trajectory.

4. The apparatus of claim 3, wherein the receptive fields correspond to divided areas of the vision sensor and overlap an area of another neighboring receptive field.

5. The apparatus of claim 3, wherein the movement trajectory tracker is configured to generate a cluster by grouping spatiotemporal correlators having a high spatiotemporal correlation from among the spatiotemporal correlators, sets a predetermined area including the cluster to be a clustering area, calculates a center of the clustering area to be a location of a moving object, and tracks a movement trajectory in conjunction with the calculated location of the moving object.

6. The apparatus of claim 5, wherein the movement trajectory tracker re-calculates a center of a previous clustering area based on an internal state value of spatiotemporal correlators in the previous clustering area, calculates the re-calculated center of the previous clustering area to be a location of the moving object, and tracks a movement trajectory in conjunction with the calculated location of the moving object in response to spatiotemporal correlators having a high spatiotemporal correlation being absent among the spatiotemporal correlators.

7. The apparatus of claim 1, wherein the second motion determiner comprises:
 a first direction detection filter configured to receive an input of events outputted from a plurality of predetermined receptive fields of the vision sensor and detect a movement direction in which the object moves for the plurality of predetermined receptive fields; and
 a second direction detection filter configured to determine a final movement direction of the object based on the movement direction detected for the plurality of receptive fields.

8. The apparatus of claim 7, wherein the predetermined receptive fields correspond to divided areas of the vision sensor, overlap an area of another neighboring receptive field, and are provided in a form of a circle.

9. The apparatus of claim 7, wherein the first direction detection filter comprises:
 at least one winner takes all circuit which corresponds to each of the predetermined receptive filters, and
 the winner takes all circuit outputs the movement direction of the object from a corresponding receptive filter, using a number of neurons which correspond to a number of directions determined by the second motion determiner.

10. The apparatus of claim 7, wherein the second direction detection filter comprises:
 a winner takes all circuit configured to determine the final movement direction of the object based on the movement direction detected for the plurality of receptive fields, and
 the winner takes all circuit is configured to output the final movement direction of the object based on the movement direction detected for the plurality of predetermined receptive fields using a number of neurons which correspond to the number of directions determined by the second motion determiner.

11. The apparatus of claim 7, wherein the second direction detection filter is configured to determine the final direction of movement of the object by calculating a vector sum of the movement direction detected for the plurality of predetermined receptive fields.

12. The apparatus of claim 1, further comprising:
 a third motion determiner configured to classify the events outputted through the vision sensor into an ON event and an OFF event, calculate a rate of the OFF event, and determine progression or regression of an object by comparing the rate to at least one predetermined reference value in response to a result of the movement type determiner indicating a small movement.

13. An apparatus for recognizing motion using an event-based vision sensor, the apparatus comprising:
 a vision sensor to sense a movement-occurring part and output events;
 a first direction detection filter configured to receive an input of events outputted from a plurality of predetermined receptive fields of the vision sensor, and detect a movement direction in which an object moves, for the plurality of predetermined receptive fields;
 a second direction detection filter configured to determine a final direction of movement of the object based on the direction of movement detected for the plurality of predetermined receptive fields; and a motion controller configured to output a control instruction for controlling a device based on the determined final movement direction.

14. The apparatus of claim 13, wherein the predetermined receptive fields correspond to divided areas of the vision sensor, overlap an area of another neighboring receptive field, and are provided in a form of a circle.

15. The apparatus of claim 13, wherein the first direction detection filter comprises:
at least one winner takes all circuit which corresponds to each of the predetermined receptive fields, and
the winner takes all circuit is configured to output the movement direction of the object from a corresponding receptive filter, using a number of neurons which correspond to a number of directions determined by the second motion determiner.

16. The apparatus of claim 13, wherein the second direction detection filter comprises:
a winner takes all circuit to determine the final movement direction of the object based on the movement direction detected for the plurality of predetermined receptive fields, and
the winner takes all circuit outputs the final movement direction of the object based on the movement direction detected for the plurality of predetermined receptive fields using a number of neurons corresponding to the number of directions determined by the second direction detection filter of a second motion determiner.

17. A method of recognizing motion, the method comprising:
receiving an input of an event which corresponds to a movement-occurring part from a vision sensor;
determining a type of movement based on a frequency of occurrence of an event;
tracking a movement trajectory of the movement-occurring part and determining a motion pattern based on the movement trajectory in response to a result of determining the type of movement indicating a small movement;
determining a movement direction in which an object moves based on the events received from the vision sensor in response to a result of the determining the type of movement indicating a large movement; and
controlling a device based on the determined motion pattern or the determined direction of movement.

18. The method of claim 17, wherein the determining of the motion pattern comprises:
receiving an input of events outputted from a plurality of predetermined receptive fields of the vision sensor, and calculating a spatiotemporal correlation of spatiotemporal correlators which correspond to each of the predetermined receptive fields;
tracking a movement trajectory of the movement-occurring part based on a fluctuation in a spatiotemporal correlation for each of the predetermined receptive fields; and
determining the motion pattern of the movement-occurring part from the tracked movement trajectory.

19. The method of claim 18, wherein the tracking of the movement trajectory comprises generating a cluster by grouping spatiotemporal correlators having a high spatiotemporal correlation from among the spatiotemporal correlators, setting a predetermined area including the cluster to be a clustering area, calculating a center of the clustering area to be a location of an object, and tracking a movement trajectory in conjunction with the calculated location of the object.

20. The method of claim 19, wherein the tracking of the movement trajectory comprises re-calculating a center of a previous clustering area based on an internal state value of spatiotemporal correlators in the previous clustering area, calculating the center of the re-calculated previous clustering area to be a location of the object, and tracking a movement trajectory in conjunction with the calculated location of the object in response to the spatiotemporal correlators having the high spatiotemporal correlation being absent among the spatiotemporal correlators.

21. The method of claim 17, wherein the determining of the movement direction comprises:
detecting the movement direction in which the object moves for a plurality of predetermined receptive fields based on the events outputted from the predetermined receptive fields of the vision sensor; and
determining a final movement direction of the object based on the movement direction detected for the plurality of predetermined receptive fields.

22. A method of recognizing motion, the method comprising:
receiving an input of events outputted from a plurality of predetermined receptive fields of a vision sensor, wherein the predetermined receptive fields are areas of the vision sensor, the areas containing sensing units that output the events;
detecting a movement direction in which an object moves, for the plurality of predetermined receptive fields of the vision sensor;
determining a final movement direction of the object based on the movement direction detected for the plurality of predetermined receptive fields; and
controlling a device based on the determined final movement direction.

23. An apparatus for recognizing motion using an event-based vision sensor, the apparatus comprising:
a vision sensor configured to sense a movement-occurring part and output events; and
a plurality of direction detection filters provided in a hierarchical structure that are configured to receive an input of events outputted from predetermined receptive fields of the vision sensor and recognize a direction of movement,
wherein the plurality of direction detection filters comprises a first direction detection filter and a second direction detection filter, the first direction detection filter comprising a plurality of winner-take-all circuits configured to receive the input of events and to provide outputs, and the second direction detection filter comprising a final winner take all circuit configured to receive the outputs of the plurality of winner-take-all circuits as inputs.

* * * * *